United States Patent
Pang

(10) Patent No.: US 6,491,812 B2
(45) Date of Patent: Dec. 10, 2002

(54) ICE WATER COOLING SYSTEM

(75) Inventor: Hsaio Hao Pang, Bau-Shan Shiang (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

(21) Appl. No.: 09/767,308

(22) Filed: Jan. 23, 2001

(65) Prior Publication Data

US 2002/0053538 A1 May 9, 2002

(30) Foreign Application Priority Data

Nov. 8, 2000 (TW) ........................ 89123558 A

(51) Int. Cl.$^7$ ................................. C02F 1/00
(52) U.S. Cl. ................ 210/126; 210/136; 210/167; 210/175; 210/205; 62/49.2; 165/301; 137/334; 137/441; 137/101.25
(58) Field of Search ................ 210/123, 126, 210/128, 167, 170, 175, 136, 194, 257.1, 97, 198.1, 205, 86, 121; 137/334, 409, 441, 101.25, 101.27; 62/49.2; 165/132, 108, 301; 422/106

(56) References Cited

U.S. PATENT DOCUMENTS

| | | | |
|---|---|---|---|
| 2,432,546 A | * | 12/1947 | Tanner |
| 4,283,925 A | * | 8/1981 | Wildfeuer |
| 4,308,912 A | * | 1/1982 | Knecht |

* cited by examiner

*Primary Examiner*—Joseph W. Drodge
*Assistant Examiner*—Terry K. Cecil
(74) *Attorney, Agent, or Firm*—J.C. Patents

(57) ABSTRACT

An ice water cooling system for a multi-story building includes an open chemical tank 304 adjacent the bottom of the building 300. The tank includes a float-level ball 310 positioned therein for controlling the flow volume of water from the pipeline circular system 302. A pump 314 and check valve 312 are positioned downstream of the tank and are configured to prevent reflux from the pipeline circular system. The float-level ball, pump and check valve act to isolate the pressure in the pipeline circular system from that of the open-chemical tank which is at atmospheric pressure.

6 Claims, 2 Drawing Sheets

ICE WATER COOLING SYSTEM

CROSS-REFERENCE TO RELATED APPLICATION

This application claims the priority benefit of Taiwan application serial no. 89123558, filed Nov. 8, 2000.

BACKGROUND OF THE INVENTION

1. Field of the Invention

The present invention relates to a cooling system that adds chemical titration. More particularly, the present invention relates to an ice water cooling system that adds chemical titration in the cold water.

2. Description of the Related Art

With the growth of technology and the economy, the popularity of an air conditioner is increasing. Freon is used in the cooling system of an air conditioner. There are also ventilators in business and factory buildings to control the inside temperature and the quantity of inside air. Some of the buildings are over crowded; therefore, some ventilators in those buildings are extremely large in size, from a few hundred tons to a few thousand tons. Because of the high cost, many ventilators in business buildings or factories will use ice water instead of freon. Ice water can decrease temperature in a cooling system. An ice water cooling system comprises a pipeline circular system, a pipeline system connected to a chemical titration tank and several circulative pumps.

FIG. 1 and FIG. 2 are schematic drawings of two types of conventional cooling systems that add chemical titration in the cold water.

Referring to FIG. 1, a cooling system in a building that has over ten floors 100. The steps of the operation of the cooling system comprise: adding chemical titration into an open chemical tank 104; installing circulative pumps at a certain position of a pipeline circular system 102; and circulating the liquid in the pipeline system to pass through the main cooling system 106 thus decreasing the temperature of the liquid and completing the air circulation. However, the liquid pressure on the pipe walls of the pipeline circular system 102 is very high because the pipeline system can not release the pressure properly. Hence the open chemical tank 104 is installed on the highest point of the pipeline circular system 102 to reduce the pressure problem of the liquid entering from the open chemical tank 104 to the pipeline circular system 102. The position for installing the open chemical tank 104 is limited. In a 100-floor sky scraper building, for example, the only position for installing the open chemical tank 104 will be on the garret of the 100 floors, so that the pressure problem caused by the liquid can be controlled. But a problem of liquid leakage can occur if the process of adding the chemical titration is not done properly.

Referring to FIG. 2, another conventional method of the cooling system is to design a closed chemical tank. The operation steps of the closed chemical tank are very similar to the open chemical tank. The steps of the process comprise: adding the chemical titration into the closed chemical tank 204; installing circular pumps at certain positions of the pipeline circular system 202; circulating the chemical titration in the pipeline circular system 202 by the installed pumps; and decreasing the temperature of the liquid in the pipeline circular system 202 by circulating the liquid through the main cooling system 206, thus controlling the air temperature and the air circulation.

The pipeline circular system 202 is connected to the closed chemical tank 204. If the closed chemical tank 204 is installed at the highest point of the pipeline circular system 202 when the pressure of the pipeline circular system 202 and the closed chemical tank 204 are the same, the closing purpose of the chemical tank 204 will then be useless. But if the closed chemical tank 204 is installed at any position below the highest point, for example at the small space beside the sky scraper building 200, the inner pressure of the closed chemical tank 204 will be different than the atmospheric pressure. To solve the pressure problem of the tank 204, an altitude valve system 208 is needed. The valve system will pump a certain amount of chemical titration at a certain pressure into the tank 204. When adding a solid chemical product, the closed chemical tank 204 needs to be opened; hence the operation is inconvenient.

As mentioned above, in the cooling system of an open chemical tank, there is an unsolvable pressure problem in the pipeline circular system. There is also a position problem of the open chemical tank due to the limited locations. Therefore the position of the tank is limited to the garret of the building. However, sometimes installing the open chemical tank at the highest point still can not solve the pressure problem in the pipeline.

The closed chemical tank also has a pressure problem. An altitude valve system is needed to control the pressure and the amount of the chemical products. But when adding a solid chemical product, it is difficult to add the solid chemical product to the tank because it is closed. The cost of the altitude valve system is very high, and chemical testing cannot be done to the liquid in the tank.

SUMMARY OF THE INVENTION

The present invention provides a cooling system that can resolve the pressure problem caused by adding the chemical titration into the pipeline circular system. The cooling system comprises: an open chemical tank, a float-level ball, and a check valve to maintain the liquid level of an open chemical tank and a pump.

The present invention provides a method of operating a cooling system, comprising the following steps. The pump is located beside the check valve. The float-level ball guides the liquid from the pipeline circular system into the chemical tank, isolating the pressure of the liquid in the pipeline circular system, and controlling the amount of liquid that flows from the pipeline circular system to the open chemical tank. The check valve allows the liquid to flow from the open chemical tank to the pipeline circular system and prevents the liquid from inversely flowing back to the tank. The functions of the float-level ball and the check valve are to isolate the pressure from the pipeline circular system and to maintain the level of the liquid in the open chemical tank.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DESCRIPTION OF THE PREFERRED EMBODIMENT

Figure 1:
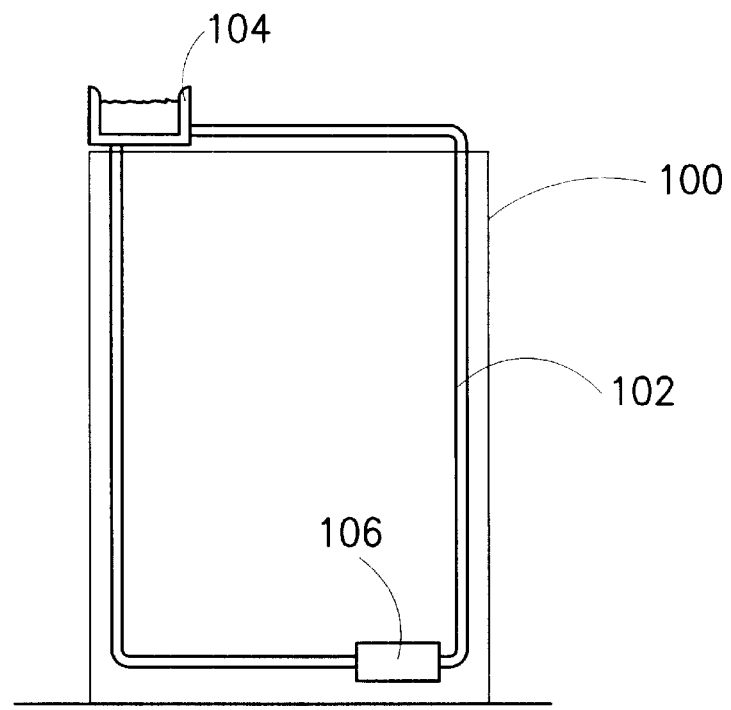
FIG. 1 is a schematic diagram showing a conventional cooling system that adds chemical titration in cold water of an open chemical tank.
Figure 2:
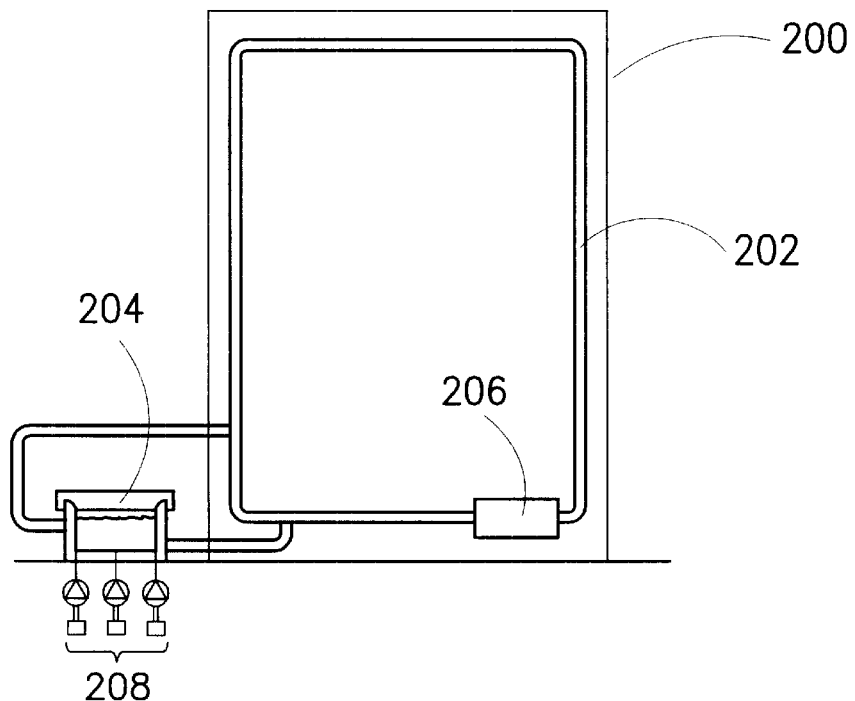
FIG. 2 is a schematic diagram showing a conventional cooling system that adds chemical titration in cold water of a closed chemical tank.
Figure 3:
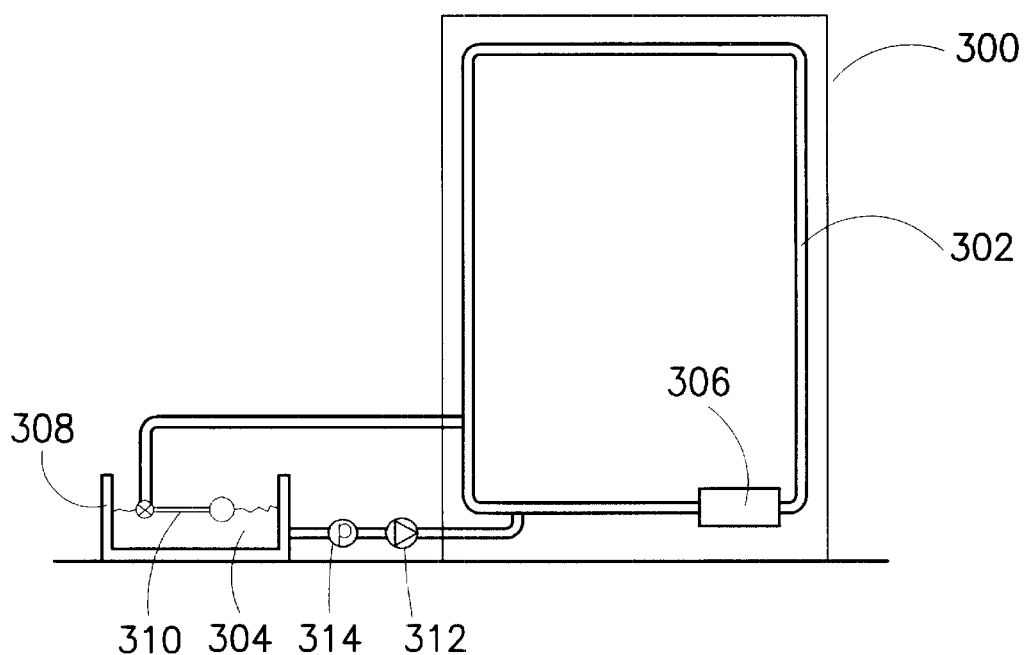
FIG. 3 is a schematic diagram showing the cooling system of the present invention that adds chemical titration in cold water.

FIG. 3 is a schematic diagram showing the cooling system of the present invention that adds chemical titration in cold water. The cooling system of the present invention comprises a building 300 and an open chemical tank 304. The chemical titration is added into the open chemical tank 304, and circulating pumps are installed at each position of the pipeline circular system 302. The chemical titration liquid is then circulated inside the pipeline circular system 302 by the circulating pump. The liquid circulation in the pipeline circular system will then pass through a cooling system 306 to reduce the temperature of the liquid. An air circulation is thus completed.

The open chemical tank 304 comprises a chemical tank wall 308, a float-level ball 310, a check valve 312 and a pump 314. The float-level ball 310 will guide the liquid from the pipeline circular system 302 to the open chemical tank 304, and the float-level ball 310 will also isolate the liquid pressure in the pipeline circular system 302.

The float-level ball 310 of the present invention is the same as the float-level ball used in a flush toilet. Thus, it has better etching resistance. The pump 314 and the check valve 312 guide the chemical liquid to flow from the open chemical tank 304 to the pipeline circular system 302 and prevent reflux from occurring.

It is another object of the pump 314 and the check valve 312 to isolate the pressure acting on the pipeline circular system 302. The pump 314 can be made of a cheaper fixed flow pump.

The maintenance of the open chemical tank 304 depends on the flowing quantity that is controlled by the flat-level ball 310 from the pipeline circular system 302. The flowing quantity from the pipeline circular system 302 to the open chemical tank 304 is self-balanced with the volume of the liquid pumping from the pipeline circular system to the open chemical tank. Therefore the volume of the liquid in the open chemical tank will not change.

The float-level ball 310 and the check valve 312 not only control the flow quantity but also prevent reflux from occurring, and they also isolate the pressure in the open chemical tank 304 and in the pipeline circular system 302.

It is an object of the present invention to separate the pressure in the open chemical tank and the pressure in the pipeline circular system by using the float-level ball and the check valve.

It is another object of the present invention to use the float-level ball and the check valve to control the flow quantity of the chemical liquid in/out of the open chemical tank and to maintain a certain liquid level.

The present invention uses an open chemical tank that is convenient for testing the liquid quality in the tank, and either a solid or a liquid of chemical product can be added into the open tank. The pressure acting on the open chemical tank is the atmospheric pressure and the pump can be made of a cheaper and simpler functioning pump.

It will be apparent to those skilled in the art that various modifications and variations can be made to the structure of the pressure invention without departing from the scope or spirit of the invention. In view of the forgoing, it is intended that the present invention cover modifications and variations of this invention provided they fall within the scope of the following claims and their equivalents.

What is claimed is:

1. An ice water cooling system that adds chemical titration in cold water, the system comprising:

an open chemical tank at atmospheric pressure located adjacent the bottom of a multi-story building structure;

a pipeline circular system positioned within said building structure and including an upper part and a lower part, said upper part at an elevation higher than a water level in said tank;

a first pipeline connected to said upper part and adapted to deliver water from said pipeline circular system to said tank and a second pipeline adapted to deliver water from said tank to said pipeline circular system;

a pump positioned in said second pipeline for pumping water from the tank to the pipeline circular system;

an isolating device adapted to isolate the pressure of the circular pipeline system comprising
 (i) a float-level ball connected to said first pipeline and positioned within said tank, said ball adapted to maintain a predetermined level of fluid in the tank by controlling a flow volume from the pipeline circular system to the tank, and
 (ii) a check valve positioned within said second pipeline, downstream of and adjacent said pump and configured to prevent water flow from said pipeline circular system back to said pump; and a cooling system coupled to the pipeline circular system.

2. The system of claim 1, wherein the flow volume that is controlled by the float-level ball is the same as a liquid volume pumped into the pipeline circular system.

3. The system of claim 1, wherein the float-level ball has an etching resistance.

4. The system of claim 1, wherein the pump controls the flow volume into the pipeline circular system.

5. The system of claim 1, wherein the pump is a fixed volume pump.

6. The system of claim 1, wherein the water that circulates in the first and second pipelines passes through the cooling system to decrease the temperature of the water.

* * * * *